3,226,332
PRODUCTION OF POTASSIUM PERMANGANATE ACTIVATED ALUMINA COMPOSITE
Robert C. Lincoln, Orinda, Calif., and Harry E. Osment, Baton Rouge, La., assignors to Kaiser Aluminum & Chemical Corporation, Oakland, Calif., a corporation of Delaware
No Drawing. Filed Jan. 14, 1965, Ser. No. 425,620
4 Claims. (Cl. 252—184)

The present application is a continuation-in-part of co-pending application Serial Number 187,208, filed by us on April 13, 1962.

This invention relates to a method of producing granular activated alumina impregnated with a solid oxidizing agent. More particularly, the invention relates to the production of granular active alumina uniformly impregnated throughout the alumina mass with the permanganate of an alkali metal, such as potassium permanganate, for use in treating fluid streams and to the articles made thereby.

The use of activated forms of alumina as a support has been widely adopted in the petroleum, petrochemical and chemical industries. Activated aluminas have been coated and/or impregnated with various agents by methods of varying complexities, which of necessity depend upon the materials involved. The principal problem in impregnating active aluminas has been to impregnate the alumina while maintaining the desired degree of activity and without destruction of the impregnant material. Materials which are particularly difficult to impregnate into active alumina forms while maintaining sufficient strength and desired properties are the permanganates of alkali metals, notably potassium permanganate.

Early development work to produce satisfactory activated alumina forms containing potassium permanganate generally involve pelletizing the alumina starting material, then evacuating the alumina pellets to clear the pores so that the alumina forms could be effectively impregnated with the oxidizing agent. After impregnation with the oxidizing agent, the alumina forms are dried to remove residual water. The final step in conventional commercial procedures is to calcine or activate the alumina to the desired degree of activity.

Other methods employed in the preparation of alumina supports have involved the formation of gels or precipitation techniques. Multi-component catalysts are generally manufactured by co-precipitation techniques; however, the products are sometimes undesirable heterogeneous masses which result because of the differences in the solubility products of the constituents.

Among the problems encountered in attempting to adapt presently used commercial procedures for the production of potassium permanganate impregnated alumina composites has been the destruction of the permanganate during final calcination or activation procedures. In addition it has proven difficult to obtain the desired uniform distribution of the oxidizing agent throughout the alumina mass.

The present invention provides a method of producing active alumina forms uniformly impregnated with a solid oxidizing agent. Moreover, the inventive method is additionally advantageous in reducing the number of processing steps previously used for alumina support production and consequently reduces the cost of producing alumina composites.

According to the invention, a method is provided for treating an alumina trihydrate starting material, such as is obtainable from Bayer plant processing, to produce active alumina forms of desired configuration uniformly impregnated with alkali metal permanganate, e.g., potassium permanganate. The method involves selectively calcining alumina trihydrate to produce a transition alumina capable of at least partial rehydration. The partially calcined alumina is then mixed with the alkali metal permanganate, e.g., potassium permanganate ($KMnO_4$) and water, to obtain a composite mixture comprising an alumina mass containing $KMnO_4$ substantially uniformly distributed throughout. The composite mixture is then granulated after which the potassium permanganate impregnated alumina granules are partially rehydrated. The term "partial rehydration" is used to denote the phenomenon of combining water molecules with molecules of alumina. Partial rehydration is important in producing the necessary strength and abrasion resistance in the alumina granules. However, complete rehydration is undesirable because it decreases the activity of the alumina and fills the pores. After impregnation and rehydration, partially rehydrated alumina granules are advantageously dried, as necessary, to prevent further rehydration by removing at least a substantial portion of the uncombined water.

The selectively calcined alumina can be granulated as desired by any suitable method. For example, the calcined alumina can be agglomerated by extrusion, compaction (as in a briquetting press) or by tumbling. The preferred method of granulating is to tumble the partially calcined alumina with water to cause nodulizing and the production of round nodules. Spherical or round nodules of alumina support are preferred because the geometrical configuration provides additional advantages in use. A common usage of the end product (impregnated alumina forms) involves interposing the composite in flowing fluid streams. In this environment, low pressure drops are advantageous in reducing power requirements. Moreover, the inherently good resistance to abrasion of the spherical forms further minimizes wear on the composites.

The step of impregnation with the oxidizing agent can be performed either prior to granulation or during granulation or agglomeration of the calcined alumina. The impregnation is accomplished by mixing the alumina with potassium permanganate in a manner to substantially uniformly distribute the oxidizing agent, e.g., permanganate, throughout the alumina mass. The permanganate can be uniformly distributed throughout the alumina mass prior to granulation by simple mechanical mixing of permanganate, alumina and water, followed by the granulating step which, as discussed above, can be performed by extrusion, compaction or tumbling. The preferred procedure, however, is to perform the impregnation and distribution of the oxidizing agent during the tumbling or nodulizing step. In this preferred embodiment, the partially calcined alumina is mixed with a pre-formed aqueous potassium permanganate solution in a tumbling mill. The potassium permanganate and water can be combined with the alumina separately or the permanganate and water can be introduced as a solution. Simultaneous impregnation and granulation has the additional advantage of producing a product which is desirably of a spherical form.

When it is desired to utilize alumina for granulation which possesses a predetermined particle size distribution, the alumina may be preground. The grinding of the alumina can be performed either before or after the selective calcination. By providing a ground alumina of predetermined particle size distribution, it is possible to obtain nodules of improved strength and other physical properties.

As an illustration of the preferred embodiment of the invention to produce nodules of active alumina impregnated with potassium permanganate, the following example is provided. Coarse alumina trihydrate obtained from Bayer plant processing of bauxite is partially calcined to produce a transition alumina capable of at least partial rehydration. The preferred method of selectively calcining involves passing alumina trihydrate through a high temperature zone very rapidly. Such a high temperature zone may be produced by employing a gas flame of sufficiently high temperature into which the trihydrate is injected. The actual temperature of calcination may be varied depending upon the contact time of the alumina in the high temperature zone. The product of the calcination is a partially calcined alumina having a loss on ignition of 6–8%. It has been determined that calcining to produce an alumina having a loss on ignition of about 1–15% results in a satisfactorily activated alumina support for the potassium permanganate uses. It is preferred that the alumina have a loss on ignition of about 5–10%. The expression "loss on ignition" refers to the standard loss of weight obtained by heating the material to 1000° C. or more for a period of about one hour. The partially calcined alumina is advantageously ground to whatever suitable particle size distribution is desired prior to subsequent treatment. A suitable particle size distribution is one wherein from 66–77% of the material is minus 325 mesh with the average being 69.3% minus 325 mesh.

The preferred manner of impregnating the partially calcined alumina with potassium permanganate comprises preparing an aqueous potassium permanganate solution which may then be filtered to remove $MnO_2$ usually present in commercially available potassium permanganate. Removal of the $MnO_2$ improves the stability of the permanganate solution. The solution should be maintained at a temperature which facilitates dissolution of potassium permanganate and avoids crystallization during transfer of the solution. Advantageously, the solution is at a temperature of 30–35° C.

The aqueous solution of potassium permanganate and the partially calcined alumina are mixed in a tumbling mill utilizing spray nozzles to introduce the permanganate solution. It has been found that a potassium permanganate solution concentration of about 85 grams of $KMnO_4$ per liter provides a desired impregnated concentration of 2.5% $MnO_4^-$ on a dry basis. A range of 0.5–10% $MnO_4^-$ has been found to be satisfactory, with the range of from about 2% to about 4% being preferred.

Potassium permanganate solution has a relatively strong agglomerating effect and a large tendency exists for the production of oversized nodules, particularly at low feed rates. Accordingly, it is advantageous to establish the rate of revolution of the tumbling mill and the axis of rotation in a manner which reduces the residence time of the alumina during tumbling. By increasing the feed rate, it is possible to further improve size control of the nodules produced.

The impregnated alumina nodules are then partially rehydrated to insure a desired density and strength. The degree of rehydration allowed to occur will depend upon the properties desired in the final product. Optimum curing, i.e., partial rehydrating, conditions for potassium permanganate impregnated alumina will therefore vary depending upon the end use of the permanganate-alumina composite. One satisfactory set of conditions has been to cure the nodules for 8 hours in a large oven at 95° C. However, care must be exercised to avoid undue amount of rehydration which would result in an extremely dense nodule incapable of allowing fluid to pass through the pores thereof. In such a case, the potassium permanganate present in the micropores of the alumina may be sealed off from contact with the fluid due to closure of the pores by the increased hydration and therefore could not be used. The cured nodules are dried to prevent rehydration beyond the desired level. In drying, it is desired to remove at least a substantial portion of the uncombined water which would, if not removed, cause further rehydration of the nodule. Care should be exercised so that the drying is conducted at a low enough temperature to avoid incipient decomposition of the permanganate. If, of course, nodules after partial rehydration or curing do not contain significant amounts of uncombined water, a separate drying stage would not be necessary.

It is sometimes desired in order to improve hardness and resistance to abrasion and dusting, as well as to insure a totally spherical configuration of the nodules, to reroll the hot cured nodules prior to drying. However, care should be exercised that there is not sufficient uncombined water present to cause significant further rehydration of the cured nodules beyond that point which is necessary to assure a sufficient degree of porosity in the end product.

As can be seen above, the invention provides a method of forming an active alumina support impregnated with the permanganate of an alkali metal, e.g., potassium permanganate. The inventive method has the additional advantage of providing a permanganate-alumina composite in which the oxidizing agent is uniformly distributed throughout the alumina support mass. The extremely uniform distribution of the impregnating agent can be advantageously achieved simultaneously with the formation of a spherical alumina support. The method of the invention additionally reduces the number of processing steps heretofore required for impregnated alumina supports thereby decreasing the cost of producing such products. The simultaneous nodular or spherical alumina formation and uniform impregnation may be accomplished during the granulating or nodulizing step by the addition of the desired agent, e.g., potassium permanganate, which can be advantageously sprayed as a liquid into contact with the alumina during agglomeration. The concentration of the oxidizing agent in the final product is achieved by adjusting the concentration or amount of oxidizing agent in the sprayed solution. In this way, the particles of alumina are agglomerated and formed to the desired size while incorporating the oxidizing agent either in a solid or solution form. Permanganate impregnated alumina composites produced according to the invention are particularly useful as deodorizing agents and air cleaners.

The mesh sizes used herein refer to the Tyler Standard Screen Scale.

It is apparent from the above discussion that various changes and modifications may be made to the invention without departing from the spirit thereof. Accordingly, the scope of the invention should not be limited except by the appended claims, wherein what is claimed is:

1. A method of producing a composite consisting essentially of potassium permanganate substantially uniformly distributed throughout a nodular support of activated alumina, said method comprising calcining an alumina trihydrate to produce an alumina having a loss on ignition of from 1% to 15% by weight and being capable of partial rehydration, combining said calcined alumina with an aqueous solution of potassium permanganate in an amount sufficient to form a coherent mass and of a concentration which will provide from 0.5% to 10%

$MnO_4^-$ based on the dry weight of the mass, forming agglomerates of said alumina and said aqueous solution, curing the agglomerates to effect partial rehydration of the activated alumina, and drying the partially rehydrated agglomerates to remove uncombined water therefrom.

2. A method of producing a composite consisting essentially of potassium permanganate substantially uniformly distributed throughout a nodular support of activated alumina, said method comprising calcining an alumina trihydrate to produce an alumina having a loss on ignition of from 5% to 10% by weight and being capable of partial rehydration, combining said calcined alumina with an aqueous solution of potassium permanganate in an amount sufficient to form a coherent mass and of a concentration which will provide from 2% to 4% $MnO_4^-$ based on the dry weight of the mass, forming agglomerates of said alumina and said aqueous solution, curing the agglomerates to effect partial rehydration of the activated alumina, and drying the partially rehydrated agglomerates to remove uncombined water therefrom.

3. A method according to claim 2 wherein said calcined alumina is of a particle size such that from 66% to 77% passes a 325 mesh screen.

4. A method according to claim 2 wherein said agglomerating is effected by nodulizing.

References Cited by the Examiner
UNITED STATES PATENTS

| | | | |
|---|---|---|---|
| 2,499,675 | 3/1950 | Owen | 252—463 XR |
| 2,644,799 | 7/1953 | Robinson | 252—463 XR |
| 2,662,860 | 12/1953 | Engel et al. | 252—463 XR |
| 3,049,399 | 8/1962 | Gamson et al. | 252—186 XR |

JULIUS GREENWALD, *Primary Examiner.*